G. C. BOVEY.
Clay-Pulverizer.
No. 117973
PATENTED AUG. 15 1871
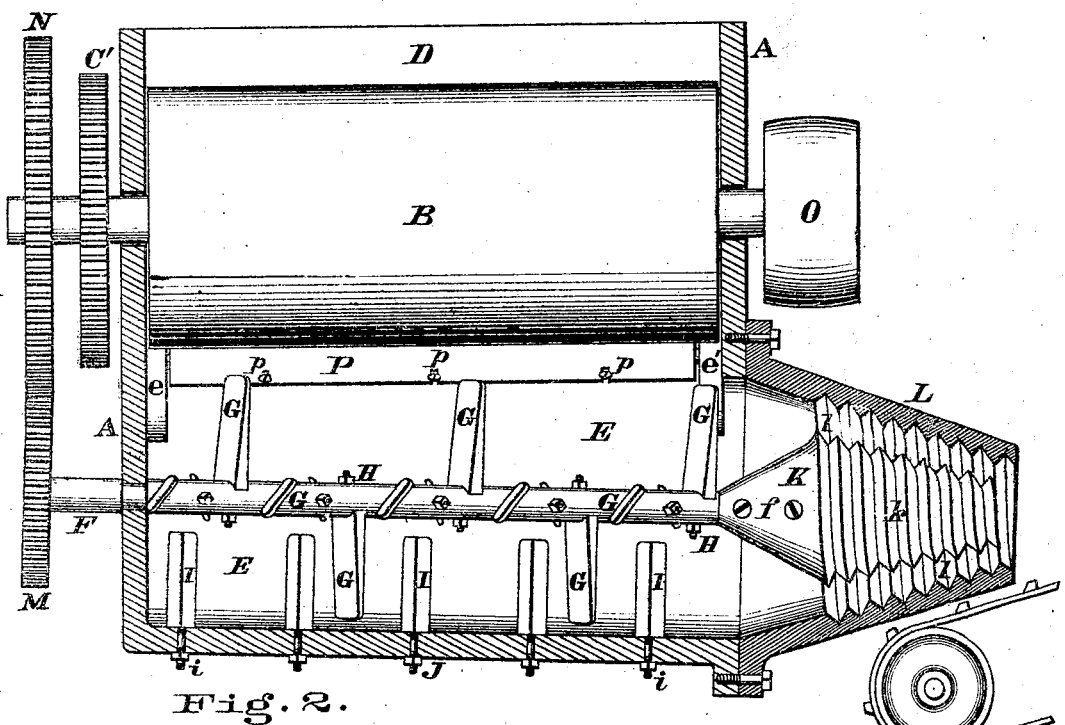
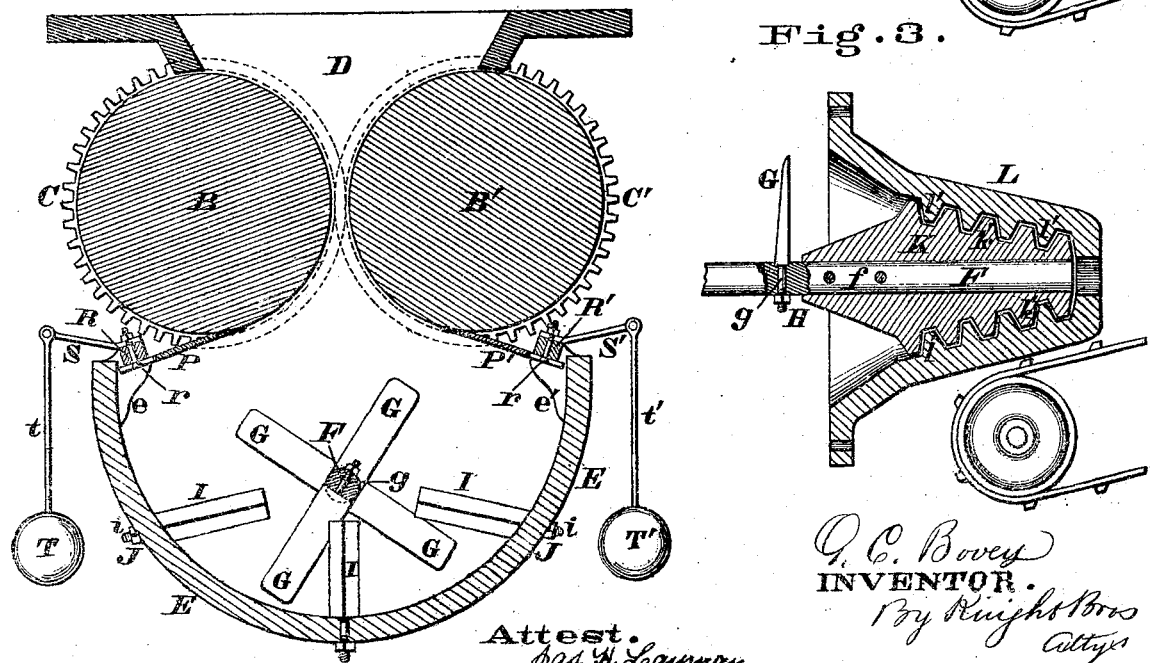

UNITED STATES PATENT OFFICE.

GEORGE C. BOVEY, OF CINCINNATI, OHIO.

IMPROVEMENT IN CLAY-PULVERIZERS.

Specification forming part of Letters Patent No. 117,973, dated August 15, 1871.

*To all whom it may concern:*

Be it known that I, GEORGE C. BOVEY, of Cincinnati, in the county of Hamilton and State of Ohio, have invented certain Improvements in Clay-Pulverizers, of which the following is a specification:

This invention relates to an apparatus which has been designed for the thorough pulverization and comminuting of untempered clay before it is discharged into the hopper of a brick-machine; and the pulverizer consists essentially of two horizontal cylinders having smooth peripheries, said cylinders being arranged so as to rotate above a shaft around which project in a spiral manner a number of blades that revolve between arms projecting inwardly from the trough in which the shaft is journaled, and the delivery end of the trough is provided with a contracted nozzle through which the clay is ejected by the action of the aforesaid blades, the details of the apparatus being hereinafter fully described.

Figure 1 is a longitudinal section through the pulverizer. Fig. 2 is a transverse section of the same, and Fig. 3 is a sectional view of a modification of the nozzle.

A represents the frame or housing of the apparatus within which are journaled two cylinders, B B', having smooth peripheries. These cylinders are horizontal and are so arranged as to leave only a slight opening between them, say about one inch, and, if preferred, one or both of said cylinders may be journaled in adjustable boxes so as to permit said opening being enlarged or reduced. These cylinders are rotated by means of even-geared wheels, C C'. Located above the cylinders is the hopper D, and situated beneath them is a semicircular trough, E, having journaled axially within it a shaft, F, that is armed with a number of blades, G, the latter being arranged around said shaft in a spiral manner. The outer ends of these blades are somewhat thinner than their inner ends, and they are provided with screw-threaded shanks $g$ and nuts H, with which they are attached to said shaft in such a manner as to be readily removed therefrom whenever they break. The shaft F is not parallel with the cylinders B B', but is preferably somewhat lower at its delivery end, as shown in Fig. 1. Projecting inwardly from the trough E are a series of arms, I, which are arranged in such a manner as to permit of the blades G rotating between them, and these arms are furnished with screw-threaded shanks $i$ and nuts $j$. Attached to the rear ends of shaft F, by bolts $f$, is a conical head, K, whose periphery may be furnished either with threads, as shown at $k$ in Fig. 1, or with teeth, as shown at $k'$ in Fig. 3. This head rotates within a contraction or nozzle, L, which is bolted to the delivery end of the trough E, and the interior of said nozzle may be provided with threads $l$ or with teeth $l'$, so as to correspond with the shape of heads shown in Figs. 1 and 3. The delivery end of shaft F may be journaled in a suitable bearing or it may be free to rotate at random within the nozzle so as to prevent the accumulation of clay at any place therein. The shaft is rotated by a pinion, M, which gears with a wheel, N, the latter being secured to the shaft of either of the cylinders. O is the driving-pulley, which may be located at any place upon the apparatus where it will be the most effective and convenient. In order to prevent the accumulation of clay upon the smooth peripheries of the cylinders I provide scrapers P P', which are mounted upon shafts R R', the latter being journaled in lugs or ears $e$ $e'$ that project from the interior of trough E. These scrapers are attached to the shafts by bolts $r$, which traverse slots $p$, by which arrangement said scrapers can be adjusted toward the cylinders whenever the former become worn. Secured to the shafts R R' are arms S S', from whose outer ends depend rods $t$ $t'$, for the attachment of weights T T' that maintain the scrapers in contact with the peripheries of the cylinders.

The untempered clay is taken from the bank and thrown directly into the hopper D, where it is subjected to the action of the cylinders B B', which effectually crush the lumps and deliver the clay in a thin sheet into the trough E. As soon as the clay is discharged from the cylinders and falls into the trough it is brought in contact with the blades G and arms I, which cause it to be thoroughly pulverized. The blades G being arranged spirally around the shaft, their rotation conveys the clay to the lowermost end of the trough, from whence it is forced into the nozzle L, where it is subjected to a final compression and pulverization. The pulverized clay, after being ejected from the nozzle, is received upon a carrier of any suitable construction and conveyed to the hopper of the brick-machine. In working some kinds of clay it may be found advantageous to omit the conical head K, but in such cases it will be advisable to arm that portion of the shaft from which said head has been removed with blades similar to the ones G, except that they are diminished in length as they approach the delivery end of the pulverizer, so as to correspond with the contraction of the nozzle L. The delivery end of shaft F may be journaled upon the inner ends of set-screws, that can project through the sides of the nozzle, and said screws may be adjusted so as to allow more or less lateral motion of the shaft.

I claim as my invention—

1. The combination of the smooth cylinders B B', gear-wheels C C', shaft F, blades G, arms I, discharge-nozzle L l, and adjustable scrapers P P', for the object stated.

2. In combination with the cylinders B B', wheels C C', trough E, shaft F, blades G, and nozzle L, the conical head K k, or its equivalent, substantially as described, for the purpose set forth.

In testimony of which invention I hereunto set my hand.

GEO. C. BOVEY.

Witnesses:
GEO. H. KNIGHT,
JAMES H. LAYMAN.